(12) United States Patent
Papadimitriou

(10) Patent No.: US 9,503,889 B2
(45) Date of Patent: Nov. 22, 2016

(54) SYSTEM AND METHOD FOR MOBILE IP

(75) Inventor: Dimitri Papadimitriou, Brussels (BE)

(73) Assignee: Alcaltel Lucent, Boulogne-Billancourt (FR)

( * ) Notice: Subject to any disclaimer, the term of this patent is extended or adjusted under 35 U.S.C. 154(b) by 1011 days.

(21) Appl. No.: 12/580,453

(22) Filed: Oct. 16, 2009

(65) Prior Publication Data

US 2010/0097994 A1   Apr. 22, 2010

(30) Foreign Application Priority Data

Oct. 17, 2008   (EP) .................................. 08305698

(51) Int. Cl.
*H04W 8/26* (2009.01)
*H04L 29/08* (2006.01)
*H04W 80/04* (2009.01)

(52) U.S. Cl.
CPC ............... *H04W 8/26* (2013.01); *H04L 69/32* (2013.01); *H04W 80/04* (2013.01)

(58) Field of Classification Search
CPC ................ H04L 61/6086; H04L 69/30; H04L 69/32; H04W 8/26; H04W 80/04
USPC ......................... 370/328, 331, 351
See application file for complete search history.

(56) References Cited

U.S. PATENT DOCUMENTS

| | | | |
|---|---|---|---|
| 6,717,944 B1 * | 4/2004 | Bryden et al. ............ | 370/392 |
| 7,221,675 B2 * | 5/2007 | Bryden et al. ............ | 370/392 |
| 7,840,217 B2 * | 11/2010 | Patel et al. ............ | 455/439 |
| 7,873,985 B2 * | 1/2011 | Baum ............................ | 726/2 |
| 7,991,854 B2 * | 8/2011 | Bahl ............................ | 709/220 |
| 8,059,661 B2 * | 11/2011 | Patel et al. ............ | 370/395.54 |
| 8,434,125 B2 * | 4/2013 | Ramesh et al. ............ | 726/1 |
| 2004/0024901 A1 | 2/2004 | Agrawal et al. | |
| 2005/0117546 A1 * | 6/2005 | Lioy et al. ............ | 370/332 |
| 2006/0029081 A1 * | 2/2006 | Yan et al. ............ | 370/395.52 |
| 2006/0233167 A1 * | 10/2006 | McAllister et al. ........ | 370/389 |
| 2007/0076732 A1 * | 4/2007 | Kim ...................... | H04L 45/507 370/409 |
| 2009/0022115 A1 * | 1/2009 | Berzin et al. ............ | 370/338 |
| 2009/0034495 A1 * | 2/2009 | Khijniak et al. ............ | 370/338 |

(Continued)

FOREIGN PATENT DOCUMENTS

| | | |
|---|---|---|
| JP | 2006-191514 | 7/2006 |
| JP | 2006-352234 | 12/2006 |
| WO | WO 01/13602 A1 | 2/2001 |

OTHER PUBLICATIONS

"Shim6: Level 3 Multihoming Shim Protocol for IPv6", pp. 1-110, archive date Mar. 16, 2008.*

(Continued)

*Primary Examiner* — Scott M Sciacca
(74) *Attorney, Agent, or Firm* — Fay Sharpe, LLP

(57) ABSTRACT

Network system for communicating between a mobile node and a correspondent node via a first IP edge-IP network-second IP edge connectivity, comprising a user IP addressing space and a network IP addressing space, wherein a locator identifier space is inserted between the user IP and network IP addressing space, wherein the first and second IP edges are associated with first and second locator identifiers, and wherein the system is further arranged for associating a mobile node with one or more IP network addresses and an IP user address decoupled from the one or more IP network addresses via the first locator identifier.

13 Claims, 2 Drawing Sheets

(56) References Cited

U.S. PATENT DOCUMENTS

| | | | |
|---|---|---|---|
| 2009/0249473 A1* | 10/2009 | Cohn ........................... 726/15 |
| 2009/0285215 A1* | 11/2009 | Kaippallimalil et al. .... 370/392 |
| 2010/0054135 A1* | 3/2010 | Rahman ............ H04L 29/12952 370/242 |
| 2010/0157926 A1* | 6/2010 | Eronen et al. ................ 370/329 |
| 2011/0064056 A1* | 3/2011 | Zhao et al. .................. 370/331 |
| 2011/0090853 A1* | 4/2011 | Chandramouli et al. ..... 370/329 |
| 2011/0299477 A1* | 12/2011 | Nikander et al. ............. 370/329 |

OTHER PUBLICATIONS

A Campbell, J. Gomez, C-Y. Wan, Columbia University, Z. Turanyi, A. Valko Ericsson, "Cellular IP," draft-valko-cellularip-01.text, IETF Standard-Working-Draft, Internet Engineering Task Force, IETF, CH, No. 1, XP015036388, pp. 1-22, (Oct. 1, 1999).
European Search Report.
"Notice of Reasons for Refusal" of corresponding Japanese Application No. 2011-531386, dated Aug. 1, 2013, 6 pages.
Ishiyama et al.; "An Analysis of Mobility Handling in LIN6;" Communication Platform Laboratory, Corporate R&D Center, Toshiba Corporation; Faculty of Science and Technology, Keio University; Jul. 29, 2011; 16 pages.

* cited by examiner

SYSTEM AND METHOD FOR MOBILE IP

The present invention relates to a network system and a method for communicating between a mobile node and a correspondent node via a first IP edge—IP network—second IP edge connectivity, wherein de mobile node may change its topological connectivity to the network while continuing to receive packets. The invention further relates to a mapper system for performing a mapping function in the mobile node/first IP edge part and in the correspondent node/second IP edge part.

In the prior art three basic mechanisms can be found to solve the IP mobility problem:
- renumbering the mobile node as it changes its topological attachment point(s) to the Internet. As a consequence the change of a network IP address will break existing transport or higher level connections for protocols using IP addresses as identifiers;
- renumbering and creating tunnels from the mobile node's new topological location back to its original location. This approach requires a home agent to keep track of the current location of the mobile node resulting in triangular routing (the correspondent node must communicate with the mobile node via the home agent). This has the disadvantage that the correspondent node must always reach the mobile node via the home agent even if the correspondent node and the mobile node were to be in two contiguous foreign networks;
- letting the mobile node announce its prefixes from its new attachment point(s). A major disadvantage of the solution is that dynamic updates are directed into the global routing system as the mobile node moves, causing scalability problems.

The object of the invention is to resolve the IP mobility problem in a scalable way so as to allow its deployment over a large scale IP infrastructure such as the Internet.

To reach this object the network system according to the invention is distinguished in that
a locator identifier space is inserted between the user IP and network IP addressing space,
wherein the first and second IP edges are associated with first and second locator identifiers, and
wherein the system is further arranged for associating a mobile node with one or more IP network addresses and an IP user address decoupled from the one or more IP network addresses via the first locator identifier.

By inserting a locator identifier space in between the user and the network IP addressing space, it is prevented that the upper IP address (i.e. the user space IP address) is used as an identifier. Hence, the IP address space semantic is resolved. Also by associating locator identifiers to IP edges the localization problem is resolved. The segmentation between the user and network IP addressing space ensures a transport connection continuity by decoupling the network position of the mobile node in the network graph from its IP address part of the transport connection identification.

By providing a system wherein more than one network address can be associated with the mobile node (i.e. allowing the use of parallel IP/DLL/PHY stacks on the mobile node) it is possible to maintain two network domains active when the mobile node moves for example from one radio domain to another or when two (or more) radio technologies are available in the same foreign network.

According to an advantageous embodiment of the network system, the system is arranged for associating a mobile node with a first and a second stack each consisting of a physical layer, a link layer and an IP network address layer, said first and second stacks being decoupled from the user address via the first locator identifier. According to a further aspect the system is arranged for keeping respectively a first and second IP network address of the first and second stack simultaneously active during a transition from a first network space domain with the first IP network address to a second network space domain with the second IP network address. By providing a first and a second stack each consisting of a physical layer, a link layer and an IP network address layer, said first and second stacks being decoupled from the user address via the first locator identifier, it is possible to move from one radio domain to another when two or more radio technologies are available in the same foreign network and this whilst guaranteeing continuity. During a transition from a first network space domain with a first IP network address to a second network space domain with a second IP network address, said network addresses can be maintained active simultaneously.

The invention further relates to a mapper system for use in communicating between a mobile node and a correspondent node via a first IP edge—IP network—second IP edge connectivity, for performing a mapping function, comprising storage means for storing a unique locator identifier of the IP edge;
means for communicating the locator identifier to a mobile node when said mobile node is located in the working field of the IP edge;
means for registering the user IP address of a mobile node when said mobile node is located in the working field of the IP edge;
means for sending a address resolution request of a user address to another IP edge associated with said user address upon request from a correspondent node located in the working field of the IP edge, and
means for receiving the network address and locator identifier corresponding with said user address and for forwarding said network address and locator identifier to the correspondent node. Introducing such mapper systems at the network edges allows for having a tunneling free solution. In short the mapper systems guarantee that the associations between the user IP address, the network IP address and the locator identifier are maintained and are available where necessary.

According to an advantageous embodiment of the mapper system of the invention, the storage means maintain a table with user addresses and corresponding network addresses and locator identifiers, optionally together with a lease time for each of said correspondences. According to another aspect the mapper system is adapted for implementation in one of the following devices: an access system, in particular a DSLAM, an edge router. Preferably, the storage means maintain a table with user addresses and corresponding network addresses and locator identifiers, optionally together with a lease time for each of said correspondences. This can limit the necessary lookups, and allows to have a up to date overview of existing links between user addresses and locator identifiers.

According to a preferred embodiment the mapper system is located in one of the following devices: an access system, in particular a DSLAM, an edge router.

Finally the invention relates to a method for communicating between a correspondent node and a mobile node having a user IP address and being assigned at least one network IP address, via a first IP edge-IP network-second IP edge connectivity, comprising the steps of
sending a locator identifier from the first IP edge to the mobile node;

sending the user address of the mobile node to the first IP edge;

sending a request for locating the user address of the mobile node from the correspondent node to the second IP edge;

sending of an address resolution request by the second IP edge to the first IP edge;

sending of the network address and locator identifier associated with the user address of the mobile node by the first IP edge to the second IP edge;

forwarding of said network address and locator identifier associated with the mobile node by the second IP edge to the correspondent node.

The system of the invention, the mapper system of the invention and the method the invention allow network mobility to be treated specifically at the network layer level without resulting in cross layer dependencies with other upper and lower layers. Further the invention provides a terminal/mobile node driven system/method without involving any intermediate processing at the forwarding plane level inside the network.

According to an advantageous embodiment the method of the invention further comprises the steps of:

sending of an address resolution request by the second IP edge to a set of IP edges comprising the first IP edge.

According to a further aspect the method further comprises the steps of:

determining said set of IP edges by performing a lookup of the user address in a IP table of the user address space and selecting the IP edges on the basis of subnet addresses corresponding with the user address. In order to know the IP Edge associated with a certain user address of a mobile node, typically a lookup of the user address will be performed in an IP table of the user address space, wherein a set of IP edges with corresponding subnet addresses are selected. The first IP Edge associated with the certain user address of the mobile node will then be part of this set of IP Edges. The address resolution request can then be sent by the second IP edge to this set of IP edges comprising the first IP edge, and of course only the first IP Edge will respond. This further ensures the scalability of the system.

According to a possible embodiment of the method of the invention an update is sent by the first IP edge to the second IP edge if a new network address is assigned to the mobile node while keeping the same locator identifier, said update comprising said new network address in association with said mobile node. Further, when a mobile node transits from one network domain having a first IP network address to another having a second IP network address, the associations with said first and second network addresses are preferably maintained active during the transition period. Yet a further development consists in sending an update by the first IP edge to the second IP edge if a current network address of the mobile node is detected inactive.

According to a possible embodiment the user address of the mobile node is obtained by the correspondent node via DNS.

According to a possible embodiment the method further comprises the steps of:

storing the user addresses and corresponding network addresses and locator identifiers in a storage associated with the second IP edge, optionally storing a lease time for each of said correspondences.

According to a possible embodiment before sending the request for locating the user address of the mobile node, said user address is obtained by the correspondent node via DNS.

According to a possible embodiment the sending of a locator identifier from the first IP edge to the mobile node consists in announcing the locator identifier to the mobile node as part of a DHCP option.

The accompanying drawings are used to illustrate presently preferred non-limiting exemplary embodiments of the present invention. The above and other advantages features and objects of the invention will become more apparent and the invention will be better understood from the following detailed description when read in conjunction with accompanying drawings in which.

Figure 1:
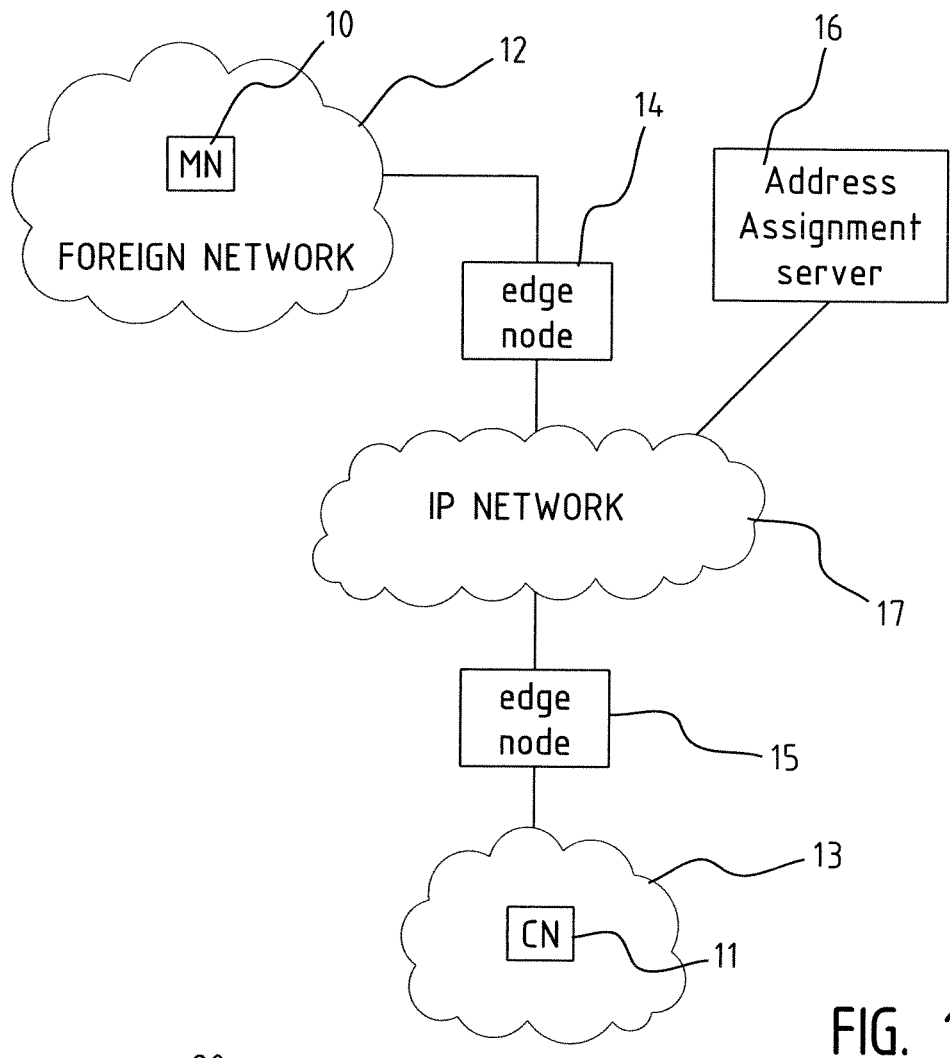
FIG. 1 is a simplified block diagram showing a communication system in which the invention can be implemented.

FIG. 1 shows a communication system for communicating data between a mobile node 10 located in a foreign network 12 and a correspondent node 11 located in e.g. a private network 13 via an IP network 17, wherein edge nodes 14, 15, such as an edge router or a DSLAM provide access to the IP network 17. The edge node (i.e. the IP edge) is basically the first node which the mobile node or correspondent node sees when it enters the IP network. Further the communication system typically comprises an address assignment server 16 such as a dynamic host configuration protocol (DHCP) server capable of assigning network addresses on IP network 40.

Figure 2:
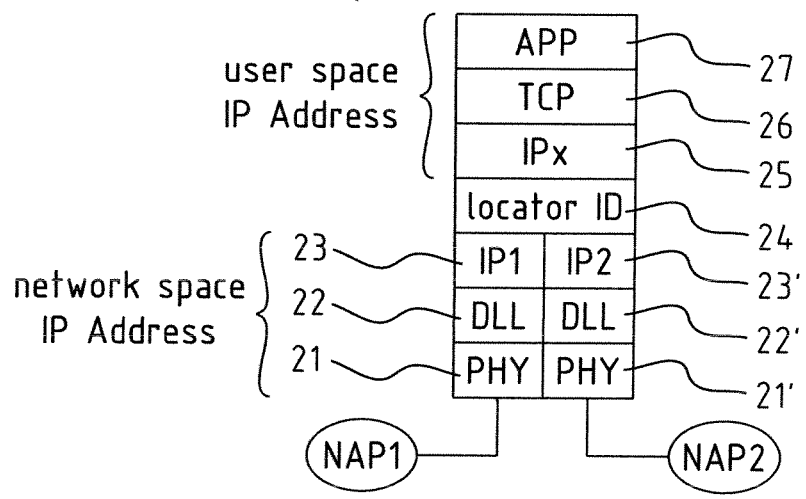
FIG. 2 shows an embodiment of a stack on the mobile node in an embodiment of the system of the invention.

According to an embodiment of the system of the invention there is provided a user IP addressing space and a network IP addressing space separated by a locator identifier (ID) space. To illustrate such an embodiment, FIG. 2 shows a possible stack 20 on the mobile node. In the illustrated embodiment two mobile node network stacks (21, 22, 23); (21', 22', 23') are present in connection with two different network attachment points 28, 29, respectively. A first network stack comprises an address layer IP1 (reference number 23), a link layer DLL (reference number 22), and a physical layer PHY (reference number 21). In a similar way the second network stack comprises address layer IP2 (23'), link layer DLL (22') and physical layer PHY (21'). The two different network attachment points 28, 29 are associated to two different network space address domains.

Typically the mobile node supports multiple DLL/PHY stacks such as IEEE 802.11 and 802.16e, or 3G and 802.11, or any other combination of radio layer technologies. The IP addresses 23, 23' of the network stack may be IPv6 addresses assigned by an address assignment server using for example DHCPv6 or SLAC (IPv6 Stateless Autoconfiguration). In Stateless autoconfiguration, a device generates a temporary address until it can determine the characteristics of the network it is on, and then creates a permanent address it can use based on that information. In the case of multi-homed devices, autoconfiguration is performed for each interface separately. A host performs the following steps when using stateless autoconfiguration:

1. Link-Local Address Generation: The device generates a link-local address. Typically this will be derived from the data link layer (MAC) address.

2. Link-Local Address Uniqueness Test: The node tests to ensure that the address it has generated is not already in use on the local network. If so, either a new address is generated, or autoconfiguration fails and another method is employed.

3. Link-Local Address Assignment: the device assigns the link-local address to its IP interface. This address can be used for communication on the local network, but not on the wider Internet (since link-local addresses are not routed).

4. Router Contact: The node next attempts to contact a local router for more information on continuing the configuration. This is done either by listening for Router Advertisement messages sent periodically by routers, or by sending a specific Router Solicitation to ask a router for information on what to do next.

5. Router Direction: The router provides direction to the node on how to proceed with the autoconfiguration. It may tell the node that on this network "stateful" autoconfiguration is in use, and tell it the address of a DHCP server to use. Alternately, it will tell the host how to determine its global Internet address.

6. Global Address Configuration: assuming that stateless autoconfiguration is in use on the network, the host will configure itself with its globally-unique Internet address. This address is generally formed from a network prefix provided to the host by the router, combined with the device's identifier as generated in the first step.

This method has numerous advantages over both manual and server-based configuration. It is particularly helpful in supporting mobility of IP devices, as they can move to new networks and get a valid address without any knowledge of local servers or network prefixes. At the same time, it still allows management of IP addresses using the (IPv6-compatible) version of DHCP if that is desired.

Thanks to the multiple stack embodiment two network addresses can remain active during transition. Transition from one network space address domain to another (IP1→IP2) is typically performed using make-before-break, i.e. the new domain is made active before the old domain is broken. In that way a transition does not affect the addressing at a transport level, i.e. at TCP/IPx level (reference numerals 24 and 25).

On top of the network stack there is inserted a locator identifier (Loc ID) 24, and the stack 20 is completed with a user address IPx layer 25, a TCP layer 26 and an application (APP) layer 27. Such a locator identifier 24 will typically be encoded as an extension header of the network IP layer and can for example be defined from a 32 bit name space. The locator identifier 24 has a double function: the locator identifier allows independency of the user communication at the transport level with respect to the network IP address, on the one hand, and facilitates locating the mobile node, on the other hand. An IP address IPx (reference numeral 25) from the user space is assigned independently of the networking addressing space.

Note that the transport protocol is typically TCP but the skilled person will understand that any other suitable transport protocol using connection-disruption principles can also be used, such as DCCP (Datagram Congestion Control Protocol). Further the network IP and DLL header can be the object of header compression.

Figure 3:
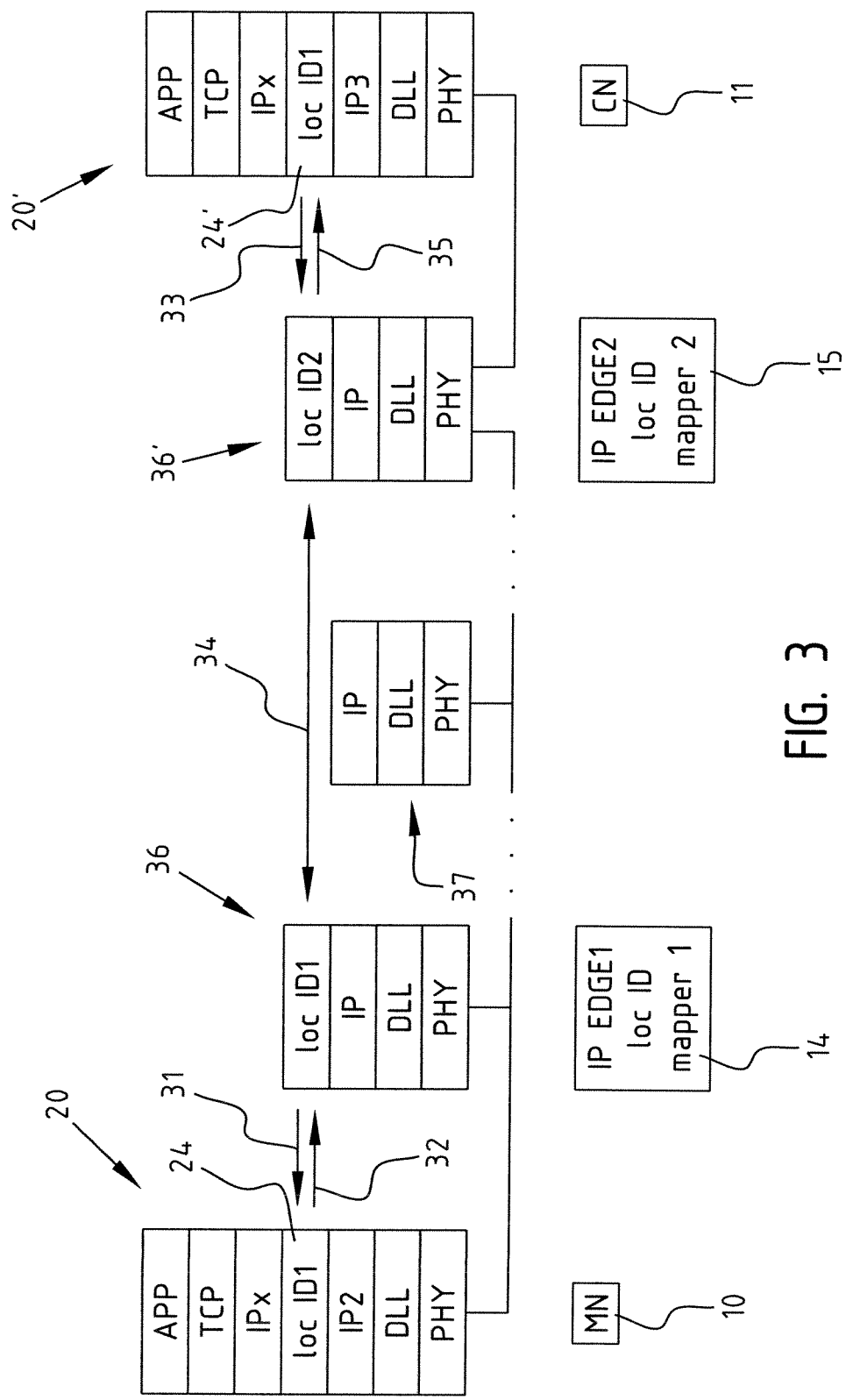
FIG. 3 is a simplified diagram illustrating an embodiment of the method of the invention.

Now an embodiment of the method of the invention will be illustrated referring to FIG. 3. In a first step 31 locator identifier (Loc ID) mapper 1 located at IP Edge 1 (depicted as block 14) announces the locator identifier (LOC ID 1) to the mobile node, for example as part of a DHCP option. In the illustrated embodiment the locator identifier mapper 1 is located at the IP Edge 1, but the skilled person will understand that this function can be anywhere in between the mobile node and the IP network. Such a locator identifier mapper can be shared between multiple subnets as long as they are part of the same foreign network. Note further that the network IP addresses of the mobile node and the correspondent node are assigned via DHCP, for instance without any change to the current IP lease request/response mechanism defined in IETF (Internet Engineering Task Force).

In a second step 32 the mobile node 10 registers its user IP address IPx to locator identifier mapper 1. This can for example be an association stored without any further information than the complementing <Loc ID, IP2> tuple.

Now it is assumed that the correspondent node 11 wants to communicate with the mobile node 10. The correspondent node 11 will first resolve the name associated with the mobile node 10 via DNS, and as a result of the DSN look up the correspondent node 11 receives the user address IPx of the mobile node 10 (not shown in FIG. 3 in order not to overload the drawings). The skilled person will understand that it is also possible to use variants of the DNS system.

Next, in a third step 33 the correspondent node anycasts a Loc IPx request to the edge router, IP Edge 2 (depicted as block 15 comprising a locator identifier mapper 2). At this point in time IP Edge 2 does not normally know the location identifier (Loc ID 1) of IP Edge 1 associated with IPx nor the network address IP2.

IP Edge 2 will now first retrieve the IP address of locator identifier mapper 1 associated with IP Edge 1 on the basis of the user address IPx. According to a possible method IP Edge 2 performs a lookup of IPx in the IP table of the user address space. The result of this lookup provides for a set of IP addresses hosting the corresponding Provider Independent (PI) subnets. For IPx this set of IP addresses will contain the IP address of IP Edge 1. Note that a given PI subnet may be partitioned over different locations. A PI prefix for an Affiliation X having N multiple locations, i.e. N multiple locator identifiers, for example, would result in the following lookup result for IPx: {IP Edge 1, . . . , IP Edge I, . . . , IP Edge N}.

In a fourth step 34, the receiving IP Edge 2 sends an address resolution request to the set of IP Edges found as a result of the lookup of IPx. This means that block 14 with IP Edge 1 and locator identifier mapper 1 will receive the request. Note that there may be a no-zero probability that a single query would reach multiple locator identifier mappers. However, only locator identifier mapper 1 associated with IP Edge 1 will respond with the tuple <IPx, Loc ID, IP2> to IP Edge 2.

Finally, IP Edge 2 responds with the tuple <IPx, Loc ID, IP2> to the correspondent node query. This is indicated by arrow 35 in FIG. 3. The link <IPx, Loc ID 1, IP2>→{IP Edge 1} will typically be entered in locator identifier mapper 2 for future use. Note that the response may include the lease time indicating the duration for which said link is valid.

An embodiment of the locator identifier mapper of the present invention typically has the following features:

The locator identifier mapper does not keep any additional timer beyond optionally those on which its association may rely (e.g. DHCP lease time). A given locator identifier mapper is a distributed association maintenance system covering a set of IP edges.

The locator identifier structure must be uniquely assigned over the connected subnets. There is no negotiation of a location identifier between the communicating correspondent node and mobile node entities.

The location identifier is not involved in the DLL micromobility handover (i.e. between base stations).

If a network address is assigned to the mobile node within the same location, the same identifier is kept and the mapper associated to IP Edge 1 may send an update of the form <IPx, Loc ID, + IP1> to the IP Edge 2 updating in this way the previous association.

If the mobile node transits from one IP network address space domain to another, it maintains both associations active during the transition period. Once IP2 is detected as inactive it is simply released by sending an update of the form <IPx, Loc ID, − IP2>. The locator identifier mapper peering with the correspondent node is only passing that information to the correspondent node.

Note that the locator identifier mapper can be implemented in any access system and/or edge router, and for example in an IP DSLAM or a 7750 router from Alcatel-Lucent.

In conclusion the main advantages of the invention are:
The solution provided is tunneling free;
The solution provided does not have any impact on the forwarding plane of any intermediate network node— see reference numeral 37 in FIG. 3;
The solution solves both the micro and macro mobility problem;
The solution provides TCP/IP continuity;
The solution provides for efficient localization.

While the principles of the invention have been set out above in connection with specific embodiments, it is to be clearly understood that this description is merely made by way of example and may not be considered as a limitation of the scope of protection which is determined by the appended claims.

The invention claimed is:

1. A network system that facilitates communicating between a mobile node and a correspondent node via a first IP edge-IP network-second IP edge connectivity, comprising:
a processor and a memory comprising instructions that, when executed by the processor cause the processor to:
send a locator identifier from the first IP edge to the mobile node;
send the user address of the mobile node to the first IP edge;
send a request for locating the user address of the mobile node from the correspondent node to the second IP edge;
send an address resolution request by the second IP edge to the first IP edge;
send the network address and locator identifier associated with the user address of the mobile node by the first IP edge to the second IP edge; and
forward said network address and locator identifier associated with the mobile node by the second IP edge to the correspondent node;
wherein the mobile node is associated with one or more IP network addresses and an IP user address arranged as layers in a stack on the mobile node, wherein the IP user address layer is decoupled from the one or more IP network address layers via a locator identifier layer that comprises the locator identifier; and
wherein the mobile terminal couples directly to the internet via the first IP edge node while the correspondent node couples directly to the internet via the second IP edge node;
wherein the system is arranged for associating the mobile node with a first and a second stack; and
wherein the system is arranged for keeping respectively a first and second IP network address of the first and second stack simultaneously active during a transition from a first network space domain with the first IP network address to a second network space domain with the second IP network address.

2. The network system according to claim 1, wherein the first and a second stack each comprise a physical layer, a link layer and an IP network address layer, said first and second stacks being decoupled from the user address via the locator identifier.

3. A mapper system associated with a IP edge that facilitates communicating between a mobile node and a correspondent node via a first IP edge-IP network-second IP edge connectivity and performing a mapping function, comprising:
a non-transitory computer-readable medium that stores a unique locator identifier of the IP edge; and
a processor configured to:
communicate the locator identifier to a mobile node when said mobile node is located in a working field of the IP edge;
register the user IP address of the mobile node when said mobile node is located in the working field of the IP edge;
send an address resolution request of a user address to another IP edge associated with said user address upon request from a correspondent node located in the working field of the IP edge;
receive the network address and locator identifier corresponding with said user address and for forwarding said network address and locator identifier to the correspondent node; and
associate the mobile node with one or more IP network addresses and an IP user address arranged as layers in a stack on the mobile node, wherein the IP user address layer is decoupled from the one or more IP network address layers via a location identifier layer comprising the locator identifier;
associate the mobile node with a first and a second stack; and
keep respectively a first and second IP network address of the first and second stack simultaneously active during a transition from a first network space domain with the first IP network address to a second network space domain with the second IP network address.

4. The mapper system according to claim 3, wherein the computer-readable medium maintains a table with user addresses and corresponding network addresses and locator identifiers, with a lease time for each of said correspondences.

5. The mapper system according to claim 3 employed in one of the following devices: an access system, a DSLAM, and an edge router.

6. A method for communicating between a correspondent node and a mobile node having a user IP address and being assigned at least one network IP address, via a first IP edge-IP network-second IP edge connectivity, comprising:
sending a locator identifier from the first IP edge to the mobile node;
sending the user address of the mobile node to the first IP edge;
sending a request for locating the user address of the mobile node from the correspondent node to the second IP edge;
sending an address resolution request by the second IP edge to the first IP edge;
sending the network address and locator identifier associated with the user address of the mobile node by the first IP edge to the second IP edge; and
forwarding of said network address and locator identifier associated with the mobile node by the second IP edge to the correspondent node;

wherein the mobile node is associated with one or more IP network addresses and an IP user address arranged as layers in a stack on the mobile node, wherein the IP user address layer is decoupled from the one or more IP network address layers via a locator identifier layer that comprises the locator identifier; and wherein the mobile terminal couples directly to the internet via the first IP edge node while the correspondent node couples directly to the internet via the second IP edge node;

wherein when a mobile node transits from one network domain having a first IP network address to another having a second IP network address, maintaining the associations with said first and second network addresses active during the transition period.

7. The method according to claim 6, further comprising: sending an address resolution request by the second IP edge to a set of IP edges comprising the first IP edge.

8. The method according to claim 7, further comprising: determining said set of IP edges by performing a lookup of the user address in a IP table of the user address space and selecting the IP edges on the basis of subnet addresses corresponding with the user address.

9. The method according to claim 6, further comprising: sending an update by the first IP edge to the second IP edge if a new network address is assigned to the mobile node while keeping the same locator identifier, said update comprising said new network address in association with said mobile node.

10. The method according to claim 6, further comprising: sending an update by the first IP edge to the second IP edge if a current network address of the mobile node is detected inactive.

11. The method according to claim 6, further comprising: storing the user addresses and corresponding network addresses and locator identifiers in a storage associated with the second IP edge, and storing a lease time for each of said correspondences.

12. The method according to claim 6, wherein before sending the request for locating the user address of the mobile node, said user address is obtained by the correspondent node via DNS.

13. The method according to claim 6, wherein the sending of a locator identifier from the first IP edge to the mobile node comprises announcing the locator identifier to the mobile node as part of a DHCP option.

* * * * *